(12) United States Patent
Nishie et al.

(10) Patent No.: US 8,470,472 B2
(45) Date of Patent: Jun. 25, 2013

(54) NON-AQUEOUS ELECTROLYTE SECONDARY BATTERY, AND METHOD FOR FABRICATING NON-AQUEOUS ELECTROLYTE SECONDARY BATTERY

(75) Inventors: Katsushi Nishie, Kyoto (JP); Tomonori Kako, Kyoto (JP); Yudai Kawasoe, Kyoto (JP); Shinya Kitano, Kyoto (JP); Sumio Mori, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 13/322,461

(22) PCT Filed: May 25, 2010

(86) PCT No.: PCT/JP2010/058779
§ 371 (c)(1),
(2), (4) Date: Nov. 24, 2011

(87) PCT Pub. No.: WO2010/137571
PCT Pub. Date: Dec. 2, 2010

(65) Prior Publication Data
US 2012/0064396 A1    Mar. 15, 2012

(30) Foreign Application Priority Data

May 27, 2009   (JP) ................................. 2009-127770

(51) Int. Cl.
*H01M 10/0567*   (2010.01)
*H01M 10/04*   (2006.01)

(52) U.S. Cl.
USPC ........................... 429/199; 429/324; 29/623.1

(58) Field of Classification Search
None
See application file for complete search history.

(56) References Cited

U.S. PATENT DOCUMENTS

| 7,115,340 | B2 * | 10/2006 | Mori ............................. 429/330 |
| 7,851,092 | B2 * | 12/2010 | Amine et al. ................. 429/326 |
| 7,968,235 | B2 * | 6/2011 | Amine et al. ................. 429/322 |
| 2012/0100435 | A1 * | 4/2012 | Kato et al. .................... 429/332 |
| 2012/0156557 | A1 * | 6/2012 | Kotato et al. ................. 429/200 |

FOREIGN PATENT DOCUMENTS

| JP | 10-189042 | 7/1998 |
| JP | 2004-111349 | 4/2004 |
| JP | 2005-285491 | 10/2005 |
| JP | 2006-120460 | 5/2006 |
| JP | 2007-048464 | 2/2007 |
| JP | 2007-103214 | 4/2007 |
| JP | 2008-034334 | 2/2008 |
| JP | 2008-041413 | 2/2008 |
| JP | 2008-146983 | 6/2008 |
| JP | 2009-163890 | 7/2009 |

* cited by examiner

*Primary Examiner* — John S Maples
(74) *Attorney, Agent, or Firm* — Jianq Chyun IP Office

(57) ABSTRACT

A non-aqueous electrolyte secondary battery includes a positive electrode containing a positive-electrode active material, a negative electrode containing a negative-electrode active material, and a non-aqueous electrolyte, and is characterized in that the non-aqueous electrolyte contains 1.0 wt % or less of a compound represented by formula (1) and 2.0 wt % or less of a cyclic sulfate ester represented by formula (2), based on the total weight of the non-aqueous electrolyte. By using the non-aqueous electrolyte including a specified amount of the compound represented by formula (1) and a specified amount of the cyclic sulfate ester, when the battery is used at a low temperature after being stored at a high temperature, the increase of the internal resistance is inhibited.

8 Claims, 1 Drawing Sheet

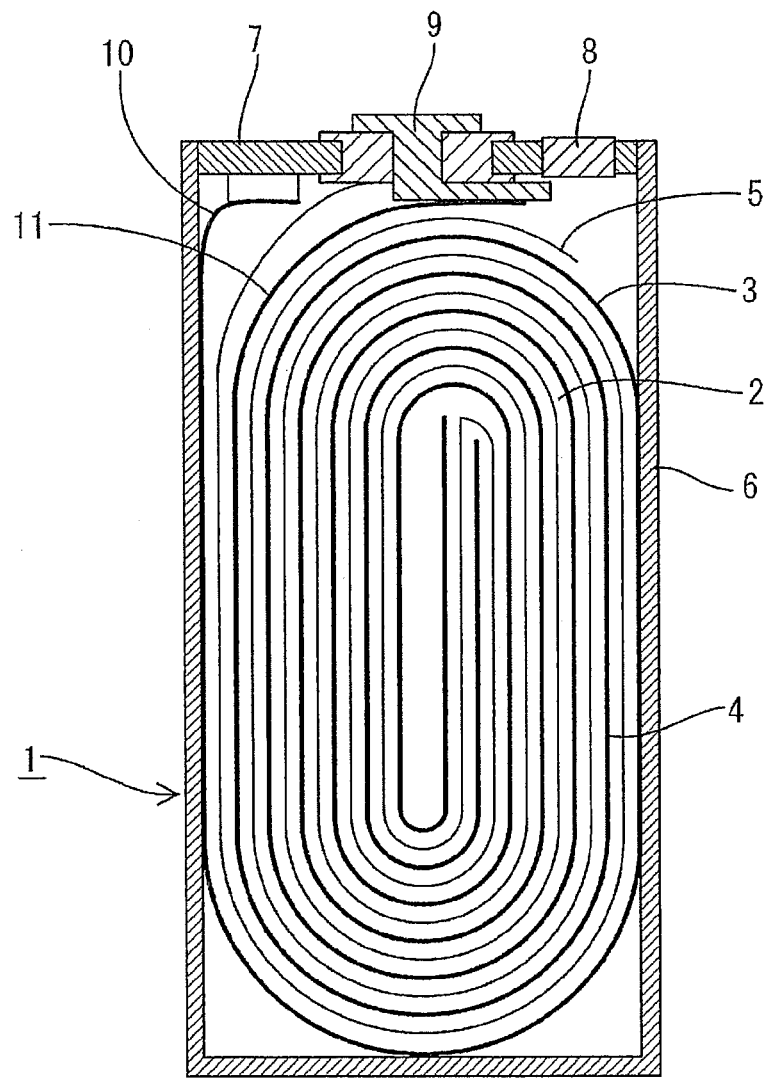

NON-AQUEOUS ELECTROLYTE SECONDARY BATTERY, AND METHOD FOR FABRICATING NON-AQUEOUS ELECTROLYTE SECONDARY BATTERY

CROSS-REFERENCE TO RELATED APPLICATION

This application is a 371 of international application of PCT application serial no. PCT/JP2010/058779, filed on May 25, 2010, which claims the priority benefit of Japan application no. 2009-127770, filed on May 27, 2009. The entirety of each of the above-mentioned patent applications is hereby incorporated by reference herein and made a part of this specification.

BACKGROUND OF THE INVENTION

1. Field of the Invention

This invention relates to a non-aqueous electrolyte secondary battery and a method for fabricating a non-aqueous electrolyte secondary battery.

2. Description of Related Art

Non-aqueous electrolyte secondary batteries such as lithium ion secondary batteries have a high voltage and a high energy density, and therefore are widely used as power supplies of mobile phones and notebook personal computers.

In this type of non-aqueous electrolyte secondary batteries (referred to as "batteries" hereinafter), a carbon material is generally used as a negative-electrode active material and a lithium-transition metal composite oxide is generally used as a positive-electrode active material, and a liquid formed by dissolving a salt such as $LiPF_6$ in a solvent such as Ethylene Carbonate (EC) or Propylene Carbonate (PC) is used as a non-aqueous electrolyte.

In order to improve the battery performance of the non-aqueous electrolyte secondary battery, it has been studied to add various additives to the non-aqueous electrolyte. For example, Patent Document 1 discloses a battery, in which an ionic metal complex is added to a non-aqueous electrolyte to improve the high-temperature cycle characteristics.

Furthermore, Patent Document 2 discloses a battery, in which a cyclic sulfate ester is added to a non-aqueous electrolyte to improve the cycle characteristics.

Patent Document 1
Japanese Patent Publication No. 2008-34334
Patent document 2
Japanese Patent Publication No. 2006-120460

SUMMARY OF THE INVENTION

Technical Problems to be Solved in the Invention

In recent years, the demand for a non-aqueous electrolyte secondary battery as power supply for a movable object such as electric vehicle or hybrid car is increased, which requires the battery performance to meet to requirements under harsh temperature conditions. For example the battery may be used under a low-temperature condition after being exposed under a high-temperature condition in a region having a large temperature difference in the day.

When the non-aqueous electrolyte secondary battery is used under a low temperature condition after being exposed under a high-temperature condition, the internal resistance of the battery is increased by cause of being exposed under the high-temperature condition, and the internal resistance will be further increased when being used under the low temperature condition. So a problem occurs that the sufficient output characteristics cannot be obtained.

Therefore, as described in Patent Document 1 and Patent Document 2, although the battery using a non-aqueous electrolyte added with an ionic metal complex or a cyclic sulfate ester alone has been studied, the problem still cannot be solved.

The present invention is directed to a non-aqueous electrolyte secondary battery, capable of inhibiting the increase of the internal resistance when being used at a low temperature after storage at a high temperature.

Technical Means for Solving the Technical Problems

To solve the above problems, the invertors have carried out in-depth studies and find that the battery using the non-aqueous electrolyte below can inhibit the increase of the internal resistance when being used at a low temperature after storage at a high temperature, in which the non-aqueous electrolyte contains 1.0 wt % or less of a compound represented by formula (1) and 2.0 wt % or less of a cyclic sulfate ester, based on the total weight of the non-aqueous electrolyte.

The present invention provides a non-aqueous electrolyte secondary battery, which includes a positive electrode containing a positive-electrode active material, a negative electrode containing a negative-electrode active material, and a non-aqueous electrolyte, and is characterized in that the non-aqueous electrolyte contains 1.0 wt % or less of a compound represented by formula (1) and 2.0 wt % or less of a cyclic sulfate ester represented by formula (2), based on the total weight of the non-aqueous electrolyte:

[Formula 1]

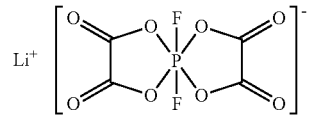

(1)

[Formula 2]

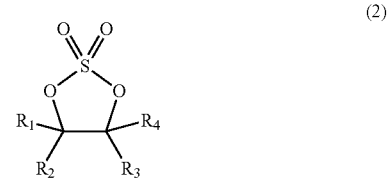

(2)

(in the formulas, $R_1$, $R_2$, $R_3$, and $R_4$ each independently represent hydrogen or an alkyl group having 1-3 carbon atoms).

Furthermore, the present invention provides a method for fabricating a non-aqueous electrolyte secondary battery, being characterized in using the non-aqueous electrolyte below, in which the non-aqueous electrolyte contains 1.0 wt % or less of a compound represented by formula (1) and 2.0 wt % or less of a cyclic sulfate ester represented by formula (2), based on the total weight of the non-aqueous electrolyte.

According to the present invention, the non-aqueous electrolyte contains 1.0 wt % or less of a compound represented by formula (1) and 2.0 wt % or less of a cyclic sulfate eater, based on the total weight of the non-aqueous electrolyte, so when the battery is used at a low temperature after storage at a high temperature, the increase of the internal resistance can be significantly lowered.

In the present invention, it is preferred that the cyclic sulfate ester represented by formula (2) is one or more selected from pentylene glycol sulfate represented by formula (3), propylene glycol sulfate represented by formula (4), and butylene glycol sulfate represented by formula (5), because the increase of internal resistance of the battery can be further lowered when the battery is used at a low temperature after storage at a high temperature.

[Formula 3]

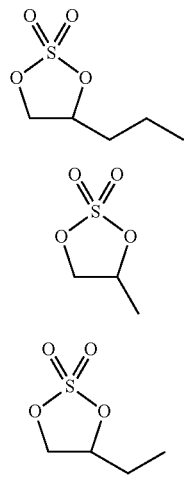

(3)

(4)

(5)

In the present invention, it is preferred that the non-aqueous electrolyte contains a compound represented by formula (1), a cyclic sulfate ester, and 5.0 wt % or less of a compound ($LiPO_2F_2$) represented by formula (6), based on the total weight of the non-aqueous electrolyte, because the increase of the internal resistance can be further lowered when the battery is used at a low temperature after storage at a high temperature.

[Formula 4]

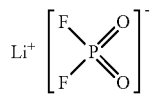

(6)

Effects of the Invention

According to the present invention, the non-aqueous electrolyte secondary battery can inhibit the increase of the internal resistance when being used at a low temperature after storage at a high temperature.

BRIEF DESCRIPTION OF THE DRAWINGS

FIG. 1 is a cross-sectional view of a non-aqueous electrolyte secondary battery according to Embodiment 1 of this invention.

DESCRIPTION OF THE EMBODIMENTS

<Embodiment 1>
Embodiment 1 of the present invention is described with reference to FIG. 1.
FIG. 1 is a schematic cross-sectional view of a square non-aqueous electrolyte secondary battery 1 according to an embodiment of the present invention. The non-aqueous electrolyte secondary battery 1 (referred to as "battery" hereinafter) is formed by storing a power generation element 2 and a non-aqueous electrolyte in a battery case 6. The power generation element 2 is formed by winding a positive electrode plate 3 and a negative electrode plate 4 separated by a separator 5 in the form of a swirl. The positive electrode plate 3 is formed by coating a slurry of a positive electrode mixture on a positive electrode current collector made of an aluminum foil. The negative electrode plate 4 is formed by coating a slurry of a negative electrode mixture on a negative electrode current collector made of a copper foil.

A battery cover 7 with a safety valve 8 is installed on the battery case 6 through laser welding. The negative electrode plate 4 is connected to a negative electrode terminal 9 located at an upper part of the battery case 6 through a negative electrode lead 11, and the positive electrode plate 3 is connected to the battery cover 7 through a positive electrode lead 10.

The positive electrode plate 3 is provided with a layer of the positive electrode mixture on both surfaces of the positive electrode current collector made of a metal foil such as aluminum foil. The layer of the positive electrode mixture contains a positive-electrode active material capable of intercalating or deintercalating lithium ions. The positive electrode lead 10 is welded to a part of the positive electrode current collector without the positive electrode mixture layer.

The positive-electrode active material in the non-aqueous electrolyte secondary battery of the present invention is not particularly limited, and various materials may be used. For example, a composite oxide represented by a general formula of $Li_xM1_pO_{2-\delta}$ or $Li_xM2_qO_{4-\delta}$ (in which each of M1 and M2 is at least one metal selected from Co, Ni and Mn, $0.4 \leq x \leq 1.2$, $0.8 \leq p \leq 1.2$, $1.5 \leq q \leq 2.2$, and $0 \leq \delta \leq 0.5$), or a compound formed by the composite oxide containing at least one element selected from Al, Fe, Cr, Ti, Zn, P and B.

Furthermore, the positive-electrode active material may be a composite oxide represented by a general formula of $LiCO_rNi_sMn_tO_{2-\delta}$ (in which $0.8 \leq r+s+t \leq 1.2$, and $0 \leq \delta \leq 0.5$) or a compound formed by the composite oxide containing at least one element selected from Al, Fe, Cr, Ti, Zn, P and B.

Furthermore, the positive-electrode active material may be a compound having an olivine structure represented by a general formula of $Li_xM3_uPO_4$ (in which M3 is a transition metal of Group 3d, $0 \leq x \leq 2$, and $0.8 \leq u \leq 1.2$). Moreover, the compound may be used after being coated with amorphous carbon.

A conductive agent and a binder may also be added in the positive-electrode active material. An inorganic compound and an organic compound can be used as conductive agent. Examples of inorganic compounds such as acetylene black, carbon black and graphite, and examples of organic compounds such as conductive polymers, for example, polyaniline. Examples of useful binders include polyvinylidene fluoride, vinylidene fluoride-hexafluoropropylene co-polymer, styrene-butadiene rubber and polyacrylonitrile, which may be used alone or in admixture.

Next, the negative electrode plate 4 is described. The negative electrode plate 4 is provided with a layer of a negative electrode mixture on both surfaces of the negative electrode current collector made of a metal foil such as copper foil. The layer of the negative electrode mixture contains a negative-electrode active material capable of intercalating or deintercalating lithium ions. The negative electrode lead 11 is welded to a part of the negative electrode current collector without the negative electrode mixture layer through ultrasonic welding.

Examples of the negative-electrode active material contained in the negative electrode mixture layer include: a carbon material such as graphite, Non-graphitizing carbon (hard carbon), and graphitizing carbon (soft carbon); a compound of an alloy of Al, Si, Pb, Sn, Zn and Cd with lithium; metal Li; metal oxide represented by a general formula of $M5O_z$ ($M5$ is at least one element selected from W, Mo, Si, Cu, and Sn, $0 \leq z \leq 2$); or a mixture thereof. Like the positive-electrode active material, the negative-electrode active material may have a binder such as polyvinylidene fluoride added.

The separator 5 may be a woven fabric, a non-woven fabric, or a synthetic resin micro-porous film, with the synthetic resin micro-porous film being preferred. Examples of the synthetic resin micro-porous films include polyolefin micro-porous films such as a polyethylene and polypropylene micro-porous film or a heat-resistant resin formed by aramid through processing, and a micro-porous film formed therefrom through compounding.

The non-aqueous electrolyte is prepared by dissolving an electrolyte salt in a non-aqueous solvent.

Examples of the electrolyte salt include $LiClO_4$, $LiPF_6$, $LiBF_4$, $LiAsF_6$, $LiCF_3CO_2$, $LiCF_3(CF_3)_3$, $LiCF_3(C_2F_5)_3$, $LiCF_3SO_3$, $LiCF_3CF_2SO_3$, $LiCF_3CF_2CF_2SO_3$, $LiN(SO_2CF_3)_2$, $LiN(SO_2CF_2CF_3)_2$, $LiN(COCF_3)_2$, $LiN(COCF_2CF_3)_2$, and $LiPF_3(CF_2CF_3)_3$, which may be used alone or in a mixture of two or more thereof. The electrolyte salt is preferably $LiPF_6$ or a mixture of $LiPF_6$ as a main component and a small amount of other electrolyte salts above.

Examples of non-aqueous solvents for dissolving the electrolyte salt include: a cyclic carbonate ester such as ethylene carbonate and propylene carbonate; a chain carbonate ester such as dimethyl carbonate, diethyl carbonate, ethyl methyl carbonate; a chain carboxylate ester such as methyl acetate and ethyl acetate; and a polar solvent such as γ-butyrolactone, sulfolane, dimethyl sulfoxide, acetonitrile, 1,2-dimethoxyethane, tetrahydrofuran, 2-methyl tetrahydrofuran, and phosphazene, which may be used alone or in a mixture of two or more thereof.

In order to improve the characteristic of the battery, a small amount of a compound may be blended into the non-aqueous electrolyte. Examples of the compound include a carbonate such as vinylene carbonate and methyl vinylene carbonate; a vinyl ester such as vinyl acetate and vinyl propionate; an aromatic compound such as benzene and toluene; a haloalkane such as perfluorooctane; and a silyl ester such as tris(trimethylsilyl) borate, tris(trimethylsilyl) phosphate, tetrakis(trimethylsilyl) titanate, which may be used alone or in a mixture of two or more thereof.

In the present invention, the non-aqueous electrolyte contains a compound represented by formula (1) (referred to as "compound of formula (1)" hereinafter) and a cyclic sulfate ester represented by formula (2) (referred to as "cyclic sulfate ester" hereinafter).

[Formula 5]

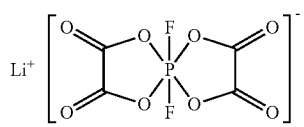

(1)

-continued

[Formula 6]

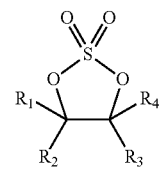

(2)

(in the formulas, $R_1$, $R_2$, $R_3$, and $R_4$ each independently represent hydrogen or an alkyl group having 1-3 carbon atoms).

Examples of the cyclic sulfate ester include ethylene glycol sulfate (GST), pentylene glycol sulfate [a compound of formula (3)], propylene glycol sulfate [a compound of formula (4)], and butylene glycol sulfate [a compound of formula (5)], which may be used alone or in a mixture of two or more thereof.

In the compounds, pentylene glycol sulfate [the compound of formula (3)], propylene glycol sulfate [the compound of formula (4)], and butylene glycol sulfate [the compound of formula (5)] are preferred.

[Formula 7]

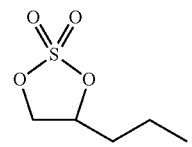

(3)

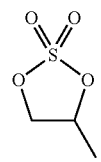

(4)

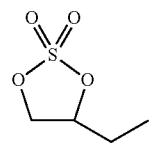

(5)

The $R_1$, $R_2$, $R_3$ and $R_4$ of the cyclic sulfate ester are preferably not an alkyl having 4 or more carbon atoms, because when the battery is used at a low temperature after storage at a high temperature, the effect of lowering the increase of the internal resistance exists, but the decomposition gets significant.

In the present invention, based on the total weight of the non-aqueous electrolyte, the non-aqueous electrolyte contains 1.0 wt % or less of the compound of formula (1) and 2.0 wt % or less of a cyclic sulfate ester.

In the battery of the present invention, a non-aqueous electrolyte below is used, in which the non-aqueous electrolyte contains 1.0 wt % or less of the compound of formula (1) and 2.0 wt % or less of a cyclic sulfate ester, based on the total weight of the non-aqueous electrolyte. Therefore, as compared with the battery using a non-aqueous electrolyte containing merely the compound of formula (1) or the cyclic sulfate ester alone, when the battery is used at a low temperature after storage at a high temperature, the increase of the internal resistance can be significantly inhibited.

If the amount of the compound of formula (1) is greater than 1.0 wt % based on the total weight of the non-aqueous electrolyte, the internal resistance is increased due to decomposition reaction of the non-aqueous electrolyte. Moreover, if the amount of the cyclic sulfate ester is greater than 2.0 wt % based on the total weight of the non-aqueous electrolyte, the concentration of acids in the electrolyte is increased due to the decomposition reaction, causing the positive-electrode active material to deteriorate and the internal resistance to increase.

In the present invention, in view of the idea that the internal resistance may be further lowered when the battery is used at a low temperature after storage at a high temperature, the amount of the compound of formula (1) is preferably 0.1 wt % or more and 0.5 wt % or less based on the total weight of the non-aqueous electrolyte, and the amount of the cyclic sulfate ester is preferably 0.1 wt % or more and 1.0 wt % or less based on the total weight of the non-aqueous electrolyte.

When the amount of the compound of formula (1) and the amount of the cyclic sulfate ester is less than 0.1 wt % based on the total weight of the non-aqueous electrolyte, the effect of inhibiting the increase of the internal resistance may be reduced.

As for the battery having the non-aqueous electrolyte containing specified amount of the compound of formula (1) and the specified amount of the cyclic sulfate ester, the mechanism of inhibiting the increase of the internal resistance after storage at a high temperature is not clear, but can be presumed as follows.

It is generally considered that a film containing the compound of formula (1) and the cyclic sulfate ester added to the electrolyte is formed on the surfaces of the positive electrode and the negative electrode. The film can inhibit the decomposition of the electrolyte, so when the battery is used at a low temperature after storage at a high temperature, the increase of the internal resistance can be inhibited.

Based on the total weight of the non-aqueous electrolyte, the addition of 5.0 wt % of a compound ($LiPO_2F_2$) represented by formula (6) to the non-aqueous electrolyte containing the compound of formula (1) and the cyclic sulfate ester can further lower the internal resistance of the battery at a low temperature. The amount of $LiPO_2F_2$ is preferably 0.2 wt % or more and 2.0 wt % or less, based on the total weight of the non-aqueous electrolyte.

[Formula 8]

(6)

EXAMPLE

The non-aqueous electrolyte secondary battery in FIG. 1 is fabricated through the following method.

1. Fabrication of the Non-Aqueous Electrolyte Secondary Battery of Example 1

(1) Fabrication of the Positive Electrode Plate

A mixture of 5 wt % of polyvinylidene fluoride as a binder, 5 wt % of acetylene black as a conductive agent, and 90 wt % of $LiNi_{0.17}Co_{0.66}Mn_{0.17}O_2$ as a positive-electrode active material was formed into a slurry by adding N-methyl-pyrrolidone (NMP). The slurry was coated on both surfaces of a positive electrode current collector made of an aluminum foil having a thickness of 20 μm and dried to fabricate a positive electrode plate 3. And a positive electrode lead 10 was connected with the positive electrode plate 3.

(2) Fabrication of the Negative Electrode Plate

A mixture of 92 wt % of non-graphitizing carbon as a negative-electrode active material and 8 wt % of polyvinylidene fluoride as a binder is formed into a slurry by adding N-methyl-pyrrolidone. The slurry was coated on both surfaces of a negative electrode current collector made of a copper foil having a thickness of 10 μm and dried to fabricate a negative electrode plate 4. And a negative electrode lead 11 was connected with the negative electrode plate 4.

(3) Fabrication of the Battery

The separator is a polyethylene micro-porous film.

A non-aqueous electrolyte was formulated with a non-aqueous electrolyte as follows. $LiPF_6$ was dissolved in a mixed solvent of ethylene carbonate (EC), dimethyl carbonate (DMC) and ethyl methyl carbonate (EMC) in a volume ratio of 3:3:4 in a concentration of 1 mol/L, and 0.01 wt % of the compound of formula (1) and 0.01 wt % of pentylene glycol sulfate (PeGST), based on the total weight of a non-aqueous electrolyte, were added.

By using the materials, three cells of Example 1 having a nominal capacity of 450 mAh were fabricated.

2. Fabrication of Batteries of Example 2 to Example 71 and Batteries of Comparative Example 1 to Comparative Example 45

The non-aqueous electrolyte secondary batteries of Example 2 to Example 15 and Comparative Example 1 to Comparative Example 15 were fabricated by the same method for fabricating the battery of Example 1, except that instead of 0.01 wt % of the compound of formula (1) (recorded as "LiFOP" in Table 1 to Table 4) and 0.01 wt % of PeGST, LiFOP and PeGST were added in an amount as shown in Table 1, based on the total weight of the non-aqueous electrolyte.

The non-aqueous electrolyte secondary batteries of Example 16 to Example 27 and Comparative Example 16 to Comparative Example 25 were fabricated by the same method for fabricating the battery of Example 1, except that instead of 0.01 wt % of the compound of formula (1) (LiFOP) and 0.01 wt % of PeGST, LiFOP and propylene glycol sulfate (PGST) were added in an amount as shown in Table 2, based on the total weight of the non-aqueous electrolyte.

The non-aqueous electrolyte secondary batteries of Example 28 to Example 39 and Comparative Example 26 to Comparative Example 35 were fabricated by the same method for fabricating the battery of Example 1, except that instead of 0.01 wt % of the compound of formula (1) (LiFOP) and 0.01 wt % of PeGST, LiFOP and butylene glycol sulfate (BGST) were added in an amount as shown in Table 3, based on the total weight of the non-aqueous electrolyte.

The non-aqueous electrolyte secondary batteries of Example 40 to Example 50 and Comparative Example 36 to Comparative Example 45 were fabricated by the same method for fabricating the battery of Example 1, except that instead of 0.01 wt % of the compound of formula (1) (LiFOP) and 0.01 wt % of PeGST, LiFOP and glycol sulfate [GST, in formula (2), $R_1$, $R_2$, $R_3$ and $R_4$ are all hydrogen] were added in an amount as shown in Table 4, based on the total weight of the non-aqueous electrolyte.

The non-aqueous electrolyte secondary batteries of Example 51 to Example 64 were fabricated by the same method for fabricating the battery of Example 1, except that instead of 0.01 wt % of the compound of formula (1) (LiFOP) and 0.01 wt % of PeGST, LiFOP, PeGST and $LiPO_2F_2$ were added in an amount as shown in Table 5, based on the total weight of the non-aqueous electrolyte.

The non-aqueous electrolyte secondary batteries of Example 65 to Example 71 were fabricated by the same method for fabricating the battery of Example 1, except that instead of 0.01 wt % of the compound of formula (1) (LiFOP) and 0.01 wt % of PeGST, LiFOP, PGST and LiPO$_2$F$_2$ were added in an amount as shown in Table 6, based on the total weight of the non-aqueous electrolyte.

3. Evaluation Test (1) Battery Performance Test after Storage at High Temperature The initial discharge capacity check test was performed by using the batteries of Example 1 to Example 71 and Comparative Example 1 to Comparative Example 45 through the following method. The batteries were charged to 4.2 V at a constant current of 450 mA at 25° C. and then charged at a constant voltage of 4.2 V, in which the charging duration was 3 hrs in total. The batteries were discharged at a constant current of 450 mA to a termination voltage of 2.5 V, so as to determine the initial discharge capacity.

The storage test at 60° C. was performed by using the batteries after the initial discharge capacity check test through the following method. The batteries were charged to 4.03 V at a constant current of 450 mA and then charged at a constant voltage of 4.03 V, in which the charging duration was 3 hrs in total. The state of charge (SOC) of the batteries was set to be 80%, and the batteries were preserved in a temperature chamber at 60° C. for 30 days (1 month). After being cooled to 25° C., the batteries were discharged at a constant current of 450 mA to a termination voltage of 2.5 V, and then charged and discharged under the same conditions in the initial discharge capacity check test. The preservation at 60° C. was repeated for 6 months. Herein, the so-called "SOC is 80%" refers to that the charging capacity is 80%, relative to the capacity of the battery.

The batteries of Example 1 to Example 71 and Comparative Example 1 to Comparative Example 45 after the storage test at 60° C. was charged to 3.73 V at a constant current of 450 mA and then charged at a constant voltage of 3.73 V, in which the charging duration was 3 hrs in total. The SOC of the battery was thus set to be 50%, and then preserved at –20° C. for 5 hrs. Then, the voltage (E1) when being discharged at 90 mA (I1) for 10 seconds and the voltage (E2) when being discharged at 225 mA (I2) for 10 seconds were measured.

The direct current (DC) resistance (Rx) at –20° C. was calculated by using the measured values according to the following equation. The DC resistance (Rx) is listed in Table 1 to Table 4.

$$Rx = |(E1-E2)/(I1-I2)|$$

Furthermore, the amount of the compound of formula (1) (weight percentage, based on the total weight of the non-aqueous electrolyte) and the amount of the cyclic sulfate ester (weight percentage, based on the total weight of the non-aqueous electrolyte) added to the non-aqueous electrolyte are shown in Table 1 to Table 4. Also, the amount of the compound of formula (1) (weight percentage, based on the total weight of the non-aqueous electrolyte), the amount of the cyclic sulfate (weight percentage, based on the total weight of the non-aqueous electrolyte), and the amount of LiPO$_2$F$_2$ (weight percentage, based on the total weight of the non-aqueous electrolyte) added to the non-aqueous electrolyte shown in Table 5 and Table 6. In the tables, the resistance refers to DC resistance. Moreover, the resistance of Example 9 and Example 12 is shown in Table 5, and the resistance of Example 22 is shown in Table 6.

TABLE 1

|  | LiFOP (wt %) | PeGST (wt %) | Resistance at –20° C. (mΩ) |
| --- | --- | --- | --- |
| Comparative Example 1 | 0 | 0 | 692 |
| Comparative Example 2 | 0.01 | 0 | 631 |
| Comparative Example 3 | 0.3 | 0 | 556 |
| Comparative Example 4 | 1.0 | 0 | 507 |
| Comparative Example 5 | 1.5 | 0 | 541 |
| Comparative Example 6 | 0 | 0.01 | 612 |
| Example 1 | 0.01 | 0.01 | 441 |
| Example 2 | 0.3 | 0.01 | 399 |
| Example 3 | 0.5 | 0.01 | 388 |
| Example 4 | 1.0 | 0.01 | 420 |
| Comparative Example 7 | 1.5 | 0.01 | 535 |
| Example 5 | 0.1 | 0.1 | 400 |
| Example 6 | 0.3 | 0.1 | 388 |
| Example 7 | 0.5 | 0.1 | 378 |
| Example 8 | 0.3 | 0.5 | 386 |
| Example 9 | 0.5 | 0.5 | 375 |
| Comparative Example 8 | 0 | 1.0 | 531 |
| Example 10 | 0.1 | 1.0 | 390 |
| Example 11 | 0.3 | 1.0 | 381 |
| Example 12 | 0.5 | 1.0 | 374 |
| Comparative Example 9 | 1.5 | 1.0 | 525 |
| Comparative Example 10 | 0 | 2.0 | 532 |
| Example 13 | 0.01 | 2.0 | 454 |
| Example 14 | 0.3 | 2.0 | 429 |
| Example 15 | 1.0 | 2.0 | 451 |
| Comparative Example 11 | 1.5 | 2.0 | 525 |
| Comparative Example 12 | 0 | 3.0 | 534 |
| Comparative Example 13 | 0.01 | 3.0 | 530 |
| Comparative Example 14 | 0.3 | 3.0 | 514 |
| Comparative Example 15 | 1.0 | 3.0 | 495 |

TABLE 2

|  | LiFOP (wt %) | PGST (wt %) | Resistance at –20° C. (mΩ) |
| --- | --- | --- | --- |
| Comparative Example 1 | 0 | 0 | 692 |
| Comparative Example 2 | 0.01 | 0 | 631 |
| Comparative Example 3 | 0.3 | 0 | 556 |
| Comparative Example 4 | 1.0 | 0 | 507 |
| Comparative Example 5 | 1.5 | 0 | 541 |
| Comparative Example 16 | 0 | 0.01 | 601 |
| Example 16 | 0.01 | 0.01 | 431 |
| Example 17 | 0.3 | 0.01 | 390 |
| Example 18 | 1.0 | 0.01 | 413 |
| Comparative Example 17 | 1.5 | 0.01 | 525 |
| Example 19 | 0.3 | 0.1 | 378 |
| Comparative Example 18 | 0 | 0.5 | 519 |
| Example 20 | 0.01 | 0.5 | 405 |
| Example 21 | 0.3 | 0.5 | 373 |
| Example 22 | 0.5 | 0.5 | 365 |
| Example 23 | 1.0 | 0.5 | 409 |
| Comparative Example 19 | 1.5 | 0.5 | 513 |
| Example 24 | 0.3 | 1.0 | 374 |
| Comparative Example 20 | 0 | 2.0 | 516 |
| Example 25 | 0.01 | 2.0 | 443 |
| Example 26 | 0.3 | 2.0 | 421 |
| Example 27 | 1.0 | 2.0 | 445 |
| Comparative Example 21 | 1.5 | 2.0 | 515 |
| Comparative Example 22 | 0 | 3.0 | 522 |
| Comparative Example 23 | 0.01 | 3.0 | 517 |
| Comparative Example 24 | 0.3 | 3.0 | 509 |
| Comparative Example 25 | 1.0 | 3.0 | 492 |

TABLE 3

|  | LiFOP (wt %) | BGST (wt %) | Resistance at –20° C. (mΩ) |
| --- | --- | --- | --- |
| Comparative Example 1 | 0 | 0 | 692 |
| Comparative Example 2 | 0.01 | 0 | 631 |
| Comparative Example 3 | 0.3 | 0 | 556 |

TABLE 3-continued

| | LiFOP (wt %) | BGST (wt %) | Resistance at −20° C. (mΩ) |
|---|---|---|---|
| Comparative Example 4 | 1.0 | 0 | 507 |
| Comparative Example 5 | 1.5 | 0 | 541 |
| Comparative Example 26 | 0 | 0.01 | 608 |
| Example 28 | 0.01 | 0.01 | 435 |
| Example 29 | 0.3 | 0.01 | 397 |
| Example 30 | 1.0 | 0.01 | 416 |
| Comparative Example 27 | 1.5 | 0.01 | 528 |
| Example 31 | 0.3 | 0.1 | 384 |
| Comparative Example 28 | 0 | 0.5 | 526 |
| Example 32 | 0.01 | 0.5 | 410 |
| Example 33 | 0.3 | 0.5 | 381 |
| Example 34 | 0.5 | 0.5 | 371 |
| Example 35 | 1.0 | 0.5 | 413 |
| Comparative Example 29 | 1.5 | 0.5 | 517 |
| Example 36 | 0.3 | 1.0 | 379 |
| Comparative Example 30 | 0 | 2.0 | 524 |
| Example 37 | 0.01 | 2.0 | 448 |
| Example 38 | 0.3 | 2.0 | 427 |
| Example 39 | 1.0 | 2.0 | 450 |
| Comparative Example 31 | 1.5 | 2.0 | 518 |
| Comparative Example 32 | 0 | 3.0 | 529 |
| Comparative Example 33 | 0.01 | 3.0 | 520 |
| Comparative Example 34 | 0.3 | 3.0 | 514 |
| Comparative Example 35 | 1.0 | 3.0 | 496 |

TABLE 4

| | LiFOP (wt %) | GST (wt %) | Resistance at −20° C. (mΩ) |
|---|---|---|---|
| Comparative Example 1 | 0 | 0 | 692 |
| Comparative Example 2 | 0.01 | 0 | 631 |
| Comparative Example 3 | 0.3 | 0 | 556 |
| Comparative Example 4 | 1.0 | 0 | 507 |
| Comparative Example 5 | 1.5 | 0 | 541 |
| Comparative Example 36 | 0 | 0.01 | 619 |
| Example 40 | 0.01 | 0.01 | 448 |
| Example 41 | 0.3 | 0.01 | 406 |
| Example 42 | 1.0 | 0.01 | 426 |
| Comparative Example 37 | 1.5 | 0.01 | 535 |
| Comparative Example 38 | 0 | 0.5 | 539 |
| Example 43 | 0.01 | 0.5 | 422 |
| Example 44 | 0.3 | 0.5 | 402 |
| Example 45 | 0.5 | 0.5 | 397 |
| Example 46 | 1.0 | 0.5 | 423 |
| Comparative Example 39 | 1.5 | 0.5 | 523 |
| Example 47 | 0.5 | 1.0 | 401 |
| Comparative Example 40 | 0 | 2.0 | 539 |
| Example 48 | 0.01 | 2.0 | 460 |
| Example 49 | 0.3 | 2.0 | 436 |
| Example 50 | 1.0 | 2.0 | 460 |
| Comparative Example 41 | 1.5 | 2.0 | 525 |
| Comparative Example 42 | 0 | 3.0 | 540 |
| Comparative Example 43 | 0.01 | 3.0 | 536 |
| Comparative Example 44 | 0.3 | 3.0 | 520 |
| Comparative Example 45 | 1.0 | 3.0 | 502 |

TABLE 5

| | LiFOP (wt %) | PeGST (wt %) | $LiPO_2F_2$ (wt %) | Resistance at −20° C. (mΩ) |
|---|---|---|---|---|
| Example 9 | 0.5 | 0.5 | 0.0 | 375 |
| Example 51 | 0.5 | 0.5 | 0.01 | 368 |
| Example 52 | 0.5 | 0.5 | 0.2 | 344 |
| Example 53 | 0.5 | 0.5 | 0.5 | 337 |
| Example 54 | 0.5 | 0.5 | 1.0 | 340 |
| Example 55 | 0.5 | 0.5 | 2.0 | 345 |
| Example 56 | 0.5 | 0.5 | 5.0 | 366 |
| Example 57 | 0.5 | 0.5 | 7.0 | 379 |
| Example 12 | 0.5 | 1.0 | 0.0 | 374 |
| Example 58 | 0.5 | 1.0 | 0.01 | 368 |
| Example 59 | 0.5 | 1.0 | 0.2 | 343 |
| Example 60 | 0.5 | 1.0 | 0.5 | 335 |
| Example 61 | 0.5 | 1.0 | 1.0 | 342 |
| Example 62 | 0.5 | 1.0 | 2.0 | 347 |
| Example 63 | 0.5 | 1.0 | 5.0 | 370 |
| Example 64 | 0.5 | 1.0 | 7.0 | 376 |

TABLE 6

| | LiFOP (wt %) | PGST (wt %) | $LiPO_2F_2$ (wt %) | Resistance at −20° C. (mΩ) |
|---|---|---|---|---|
| Example 22 | 0.5 | 0.5 | 0.0 | 365 |
| Example 65 | 0.5 | 0.5 | 0.01 | 356 |
| Example 66 | 0.5 | 0.5 | 0.2 | 338 |
| Example 67 | 0.5 | 0.5 | 0.5 | 331 |
| Example 68 | 0.5 | 0.5 | 1.0 | 330 |
| Example 69 | 0.5 | 0.5 | 2.0 | 335 |
| Example 70 | 0.5 | 0.5 | 5.0 | 358 |
| Example 71 | 0.5 | 0.5 | 7.0 | 370 |

4. Observations

As for the batteries (Example 1 to Example 50) having a non-aqueous electrolyte containing 1.0 wt % or less of the compound of formula (1) and 2.0 wt % or less of a cyclic sulfate ester based on the total weight of the non-aqueous electrolyte, the DC resistance at −20° C. is 460 mΩ or less.

Among the batteries of the present invention, as for the batteries (Example 5 to Example 12, Example 19, Example 21, Example 22, Example 24, Example 31, Example 33, Example 34, and Example 36) containing 0.1 wt % or more and 0.5 wt % or less of the compound of formula (1) and 0.1 wt % or more and 1.0 wt % or less of PeGST, PGST or BGST as a cyclic sulfate ester based on the total weight of the non-aqueous electrolyte, a preferred result that the DC resistance at −20° C. is 400 mΩ or less is obtained.

On the other hand, as for the batteries in which the content of the compound of formula (1) or the content of the cyclic sulfate ester are higher than the contents in the present invention (batteries of Comparative Example 5, Comparative Example 7, Comparative Example 9, Comparative Example 11 to Comparative Example 15, Comparative Example 17, Comparative Example 19, Comparative Example 21 to Comparative Example 25, Comparative Example 27, Comparative Example 29, Comparative Example 31 to Comparative Example 35, Comparative Example 37, Comparative Example 39, and Comparative Example 41 to Comparative Example 45), a result that the DC resistance at −20° C. is high (513 mΩ or more) is obtained. It is generally believed that if one of the amount of the compound of formula (1) and the amount of the cyclic sulfate ester are higher than the specified amounts, a gas is generated by decomposition of the non-aqueous electrolyte and thus the internal resistance is increased.

Furthermore, as for the batteries in which the cyclic sulfate ester is absent, and the content of the compound of formula (1) is 1.0 wt % or less based on the total weight of the non-aqueous electrolyte (Comparative Example 2 to Comparative Example 4), as compared with the batteries in which both the cyclic sulfate ester and the compound of formula (1) are absent (Comparative Example 1), the DC resistance at −20° C. is decreased. However a significant effect of the battery of the present invention cannot be obtained. Moreover, as for the batteries in which the compound of formula (1) is absent, and the content of the cyclic sulfate ester is 2.0 wt % or less based on the total weight of the non-aqueous electrolyte (batteries of Comparative Example 6, Comparative Example 8, Comparative Example 10, Comparative Example 16, Comparative Example 18, Comparative Example 20, Comparative Example 26, Comparative Example 28, Comparative Example 30, Comparative Example 36, Comparative Example 38, and Comparative Example 40), as compared with the batteries in which both the compound of formula (1) and the cyclic sulfate ester are absent (Comparative Example 1), the DC resistance at −20° C. is decreased, but the significant effect of the battery of the present invention cannot be obtained.

As for the batteries of Example 51 to Example 56, Example 58 to Example 63, and Example 65 to Example 70 in which besides the compound of formula (1) and the cyclic sulfate ester, 0.01 wt % to 5.0 wt % of $LiPO_2F_2$ is added, as compared with the batteries of Example 9, Example 12, and Example 22 in which $LiPO_2F_2$ is not added, the DC resistance at −20° C. is further decreased. Especially for the batteries in which 0.2 wt % or more and 2.0 wt % or less of $LiPO_2F_2$ is added (Example 52 to Example 55, Example 59 to Example 62, Example 66 to Example 69), the resistance at −20° C. is significantly decreased. Moreover, as for the batteries in which besides the compound of formula (1) and the cyclic sulfate ester, 7.0 wt % of $LiPO_2F_2$ is further added (Example 57, Example 64, Example 71), a DC resistance at −20° C. that is substantially the same as the batteries in which $LiPO_2F_2$ is not added (Example 9, Example 12, Example 22) is exhibited.

It can be known from the results that by setting the content of the compound of formula (1) to be 1.0 wt % or less and the content of the cyclic sulfate ester to be 2.0 wt % or less based on the total weight of the non-aqueous electrolyte, when the battery is used at a low temperature after storage at a high temperature, the increase of the internal resistance can be inhibited.

It is known that, in the present invention, if a compound of formula (1), the cyclic sulfate ester, and 0.01 wt % to 5.0 wt % of a $LiPO_2F_2$, based on the total weight of the non-aqueous electrolyte, are added to the non-aqueous electrolyte, when the battery is used at a low temperature after storage at a high temperature, the increase of the internal resistance can be significantly inhibited.

<Other Embodiments>

The present invention is not limited to the embodiments described with reference to the content and drawings, for example, the following embodiments are within the technical scope of the present invention.

(1) In the examples, pentylene glycol sulfate, propylene glycol sulfate, butylene glycol sulfate, glycol sulfate are used as the cyclic sulfate ester, a cyclic sulfate ester of formula (2) in which $R_1$, $R_2$, $R_3$, and $R_4$ are all methyl, $R_1$, $R_2$, $R_3$, and $R_4$ are all ethyl, or 2 or 3 of $R_1$, $R_2$, $R_3$, and $R_4$ are methyl or ethyl may also be used.

What is claimed is:
1. A non-aqueous electrolyte secondary battery, comprising a positive electrode containing a positive-electrode active material, a negative electrode containing a negative-electrode active material, and a non-aqueous electrolyte, wherein,
based on the total weight of the non-aqueous electrolyte, the non-aqueous electrolyte contains 0.01 wt %-1.0 wt % of a compound represented by formula (1) and 0.01 wt %-2.0 wt % of a cyclic sulfate ester represented by formula (2):

[Formula 1]

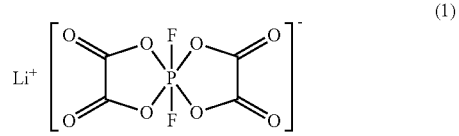

[Formula 2]

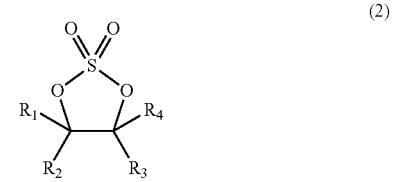

(in the formulas, $R_1$, $R_2$, $R_3$, and $R_4$ each independently represent hydrogen or an alkyl group having 1-3 carbon atoms).

2. The non-aqueous electrolyte secondary battery of claim 1, wherein
the cyclic sulfate ester_of formula (2) is one or more selected from pentylene glycol sulfate represented by formula (3), propylene glycol sulfate represented by formula (4), and butylene glycol sulfate represented by formula (5):

[Formula 3]

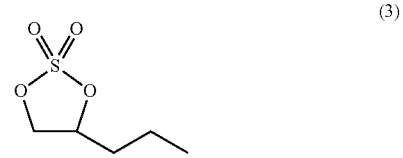

3. The non-aqueous electrolyte secondary battery of claim 1, wherein
based on the total weight of the non-aqueous electrolyte, the non-aqueous electrolyte contains 0.01 wt %-5.0 wt % of a compound represented by formula (6):

[Formula 4]

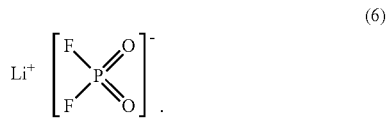

4. A method for fabricating a non-aqueous electrolyte secondary battery, wherein
the non-aqueous electrolyte of claim 1 is used.

5. The non-aqueous electrolyte secondary battery of claim 2, wherein
based on the total weight of the non-aqueous electrolyte, the non-aqueous electrolyte contains 0.01 wt %-5.0 wt % of a compound represented by formula (6):

[Formula 4]

(6)

6. A method for fabricating a non-aqueous electrolyte secondary battery, wherein
the non-aqueous electrolyte of claim 2 is used.

7. A method for fabricating a non-aqueous electrolyte secondary battery, wherein
the non-aqueous electrolyte of claim 3 is used.

8. A method for fabricating a non-aqueous electrolyte secondary battery, wherein
the non-aqueous electrolyte of claim 5 is used.

\* \* \* \* \*